(12) United States Patent
Staples

(10) Patent No.: US 12,275,476 B2
(45) Date of Patent: Apr. 15, 2025

(54) BICYCLE DROPPER SEAT POST ASSEMBLY WITH A LOCKING SPRING CARTRIDGE

(71) Applicant: D3 Innovation Inc., Squamish (CA)

(72) Inventor: Jonathan Staples, Squamish (CA)

(73) Assignee: D3 Innovation Inc., Squamish (CA)

( * ) Notice: Subject to any disclaimer, the term of this patent is extended or adjusted under 35 U.S.C. 154(b) by 0 days.

(21) Appl. No.: 18/347,864

(22) Filed: Jul. 6, 2023

(65) Prior Publication Data
US 2023/0348004 A1 Nov. 2, 2023

Related U.S. Application Data

(63) Continuation of application No. 17/495,925, filed on Oct. 7, 2021, now Pat. No. 11,767,073.

(60) Provisional application No. 63/089,738, filed on Oct. 9, 2020.

(51) Int. Cl.
*B62J 1/08* (2006.01)

(52) U.S. Cl.
CPC ............ *B62J 1/08* (2013.01); *B62J 2001/085* (2013.01)

(58) Field of Classification Search
CPC ........... B62J 1/08; B62J 2001/085; B62J 1/00
See application file for complete search history.

(56) References Cited

U.S. PATENT DOCUMENTS

| | | |
|---|---|---|
| 3,208,767 A | 9/1965 | Alexander |
| 3,730,019 A | 5/1973 | Ballard |
| 4,354,398 A | 10/1982 | Porter |
| 4,421,357 A | 12/1983 | Shimano |
| 4,807,856 A | 2/1989 | Teckenbrock |
| 4,916,968 A | 4/1990 | Kabaya |
| 4,995,753 A | 2/1991 | Shook |
| 5,044,648 A | 9/1991 | Knapp |
| 5,226,624 A | 7/1993 | Kingsbery |
| 5,244,301 A | 9/1993 | Kurke |
| 5,466,042 A | 11/1995 | Herman |

(Continued)

FOREIGN PATENT DOCUMENTS

| | | |
|---|---|---|
| CN | 105539641 A | 5/2016 |
| CN | 206031585 U | 3/2017 |

(Continued)

OTHER PUBLICATIONS

Mad Suspension Manic Drop Post, information found onine at https://www.xfusionshox.com/products_detail/44.htm 2020.

(Continued)

*Primary Examiner* — Milton Nelson, Jr.
(74) *Attorney, Agent, or Firm* — Marks & Clerk; Kevin Shipley

(57) ABSTRACT

A dropper post assembly for supporting a bicycle seat may include an outer tube extending along a post axis and an inner tube configured to be axially slidable within the outer tube by a travel distance that is at least 200 mm between a retracted and an extended position. A spring cartridge may have an unlocked configuration in which the spring cartridge exerts an extension force (FE) on the inner tube that biases the inner tube toward the extended position, and a locked configuration in which the spring cartridge is operable to generate a degassing force (FD) of between about 90 lbs and about 140 lbs to resist movement of the inner tube toward the retracted configuration.

20 Claims, 8 Drawing Sheets

(56) References Cited

U.S. PATENT DOCUMENTS

| | | | |
|---|---|---|---|
| 5,649,738 A | 7/1997 | Thomson | |
| 5,664,829 A | 9/1997 | Thomson | |
| 5,722,718 A | 3/1998 | Still | |
| 5,829,733 A | 11/1998 | Becker | |
| 5,857,657 A | 1/1999 | Yamamoto | |
| 5,881,988 A | 3/1999 | Liu | |
| 5,899,530 A | 5/1999 | Tedesco | |
| 5,909,890 A | 6/1999 | Sachs | |
| 5,979,978 A | 11/1999 | Olsen | |
| 6,220,582 B1 | 4/2001 | Wandschneider | |
| 6,276,756 B1 | 8/2001 | Cho | |
| 6,688,331 B2 | 2/2004 | Demersseman | |
| 7,007,587 B2 | 3/2006 | Zanden | |
| 7,025,522 B2 | 4/2006 | Sicz | |
| 7,059,592 B2 | 6/2006 | Huh | |
| 7,083,180 B2 | 8/2006 | Turner | |
| 7,231,866 B2 | 6/2007 | Seong | |
| 7,306,206 B2 | 12/2007 | Turner | |
| 7,721,640 B2 | 5/2010 | Lee | |
| 7,845,602 B1 | 12/2010 | Young | |
| 8,079,772 B1 | 12/2011 | Brennan | |
| 8,167,373 B2 | 5/2012 | Allison | |
| 8,177,251 B2 | 5/2012 | Shirai | |
| 8,191,964 B2 | 6/2012 | Hsu | |
| 8,308,124 B2 | 11/2012 | Hsu | |
| 8,328,454 B2 | 12/2012 | McAndrews | |
| 8,550,551 B2 | 10/2013 | Shirai | |
| 8,752,893 B2 | 6/2014 | Chien | |
| 8,814,109 B2 | 8/2014 | Laird | |
| 8,926,216 B2 | 1/2015 | McAndrews | |
| 9,073,592 B2 | 7/2015 | Hsu | |
| 9,376,159 B2 | 6/2016 | Kuo | |
| 9,688,331 B1 | 6/2017 | Shirai | |
| 9,878,753 B2 | 1/2018 | Tsai | |
| 9,969,448 B1 | 5/2018 | Chen | |
| 10,189,522 B2 | 1/2019 | Pittens | |
| 10,450,022 B2 | 10/2019 | Watson | |
| 10,513,300 B2 | 12/2019 | Bowers | |
| 10,549,803 B2 | 2/2020 | Shipman | |
| 10,787,215 B1 | 9/2020 | Staples | |
| 10,974,781 B2 | 4/2021 | Staples | |
| 11,104,395 B2 | 8/2021 | Staples | |
| 11,180,212 B2 | 11/2021 | Shirai | |
| 11,364,963 B2 | 6/2022 | Staples | |
| 11,447,201 B2 | 9/2022 | Coaplen | |
| 11,479,314 B2 | 10/2022 | Staples | |
| 11,767,073 B2 | 9/2023 | Staples | |
| 11,780,520 B1 | 10/2023 | Staples | |
| 11,834,121 B2 | 12/2023 | Staples | |
| 11,964,722 B2 | 4/2024 | Staples | |
| 2002/0185581 A1 | 12/2002 | Trask | |
| 2003/0234144 A1 | 12/2003 | Fox | |
| 2004/0065238 A1 | 4/2004 | Chen | |
| 2004/0070168 A1 | 4/2004 | McKinnon | |
| 2005/0067863 A1 | 3/2005 | Roizen | |
| 2006/0066074 A1 | 3/2006 | Turner | |
| 2006/0152045 A1 | 7/2006 | Okajima | |
| 2006/0280552 A1* | 12/2006 | Turner | B62K 19/36 403/345 |
| 2007/0046081 A1 | 3/2007 | Shook | |
| 2007/0063554 A1 | 3/2007 | Liao | |
| 2007/0286671 A1 | 12/2007 | Meggiolan | |
| 2009/0066124 A1 | 3/2009 | Pirovano | |
| 2009/0108642 A1 | 4/2009 | Hsu | |
| 2009/0266656 A1 | 10/2009 | Murakami | |
| 2009/0266657 A1 | 10/2009 | Murakami | |
| 2010/0052377 A1 | 3/2010 | Hsu | |
| 2010/0148412 A1 | 6/2010 | Murakami | |
| 2011/0097139 A1 | 4/2011 | Hsu | |
| 2011/0291446 A1 | 12/2011 | Bourgeois | |
| 2012/0027510 A1 | 2/2012 | Chen | |
| 2012/0098175 A1 | 4/2012 | Wu | |
| 2012/0181824 A1 | 7/2012 | Hsu | |
| 2012/0217686 A1 | 8/2012 | Pelot | |
| 2013/0269655 A1 | 10/2013 | Yamazaki | |
| 2014/0239682 A1 | 8/2014 | Tisue | |
| 2014/0305253 A1 | 10/2014 | Tseng | |
| 2015/0091271 A1 | 4/2015 | Ikeda | |
| 2015/0145294 A1 | 5/2015 | Kench, III | |
| 2015/0191208 A1 | 7/2015 | Hsu | |
| 2015/0232142 A1* | 8/2015 | Shirai | B62K 19/36 403/104 |
| 2015/0232158 A1 | 8/2015 | Bouse | |
| 2017/0096184 A1 | 4/2017 | Hara | |
| 2017/0096185 A1 | 4/2017 | Hara | |
| 2017/0166275 A1 | 6/2017 | McPherson | |
| 2017/0225731 A1 | 8/2017 | Hsu | |
| 2017/0341692 A1 | 11/2017 | Shirai | |
| 2018/0015976 A1 | 1/2018 | Hermansen | |
| 2018/0057087 A1 | 3/2018 | Jhou | |
| 2018/0127041 A1 | 5/2018 | Tsai | |
| 2019/0039680 A1 | 2/2019 | Angell | |
| 2019/0263464 A1 | 8/2019 | Staples | |
| 2019/0283827 A1 | 9/2019 | Shipman | |
| 2019/0300088 A1 | 10/2019 | Jordan | |
| 2019/0301497 A1 | 10/2019 | Jordan | |
| 2019/0308681 A1 | 10/2019 | Staples | |
| 2020/0023918 A1 | 1/2020 | Shirai | |
| 2020/0070913 A1 | 3/2020 | Staples | |
| 2020/0140029 A1 | 5/2020 | Shipman | |
| 2020/0247492 A1* | 8/2020 | Coaplen | B62J 1/08 |
| 2020/0317282 A1 | 10/2020 | Staples | |
| 2020/0317283 A1 | 10/2020 | Staples | |
| 2021/0179217 A1 | 6/2021 | Staples | |
| 2021/0214031 A1 | 7/2021 | Liao | |
| 2022/0106005 A1 | 4/2022 | Shirai | |
| 2022/0111919 A1 | 4/2022 | Staples | |
| 2022/0153371 A1 | 5/2022 | Tung | |
| 2022/0281546 A1 | 9/2022 | Staples | |
| 2023/0019338 A1 | 1/2023 | Staples | |
| 2023/0211844 A1 | 7/2023 | Lin | |
| 2023/0322318 A1 | 10/2023 | Staples | |
| 2023/0322319 A1 | 10/2023 | Staples | |
| 2023/0322320 A1 | 10/2023 | Staples | |
| 2024/0109617 A1 | 4/2024 | Staples | |
| 2024/0116587 A1 | 4/2024 | Staples | |

FOREIGN PATENT DOCUMENTS

| | | |
|---|---|---|
| EP | 2657113 | 10/2013 |
| EP | 3196107 A1 | 7/2017 |
| EP | 3348465 | 7/2018 |
| FR | 2409182 A1 | 6/1979 |
| GB | 2506465 | 4/2014 |
| TW | 201219256 A | 5/2012 |
| TW | M451292 U | 4/2013 |
| TW | M510270 | 10/2015 |
| TW | M510270 U | 10/2015 |
| TW | 201545930 | 12/2015 |
| TW | 201545930 A | 12/2015 |
| TW | M513153 | 12/2015 |
| TW | M517710 U | 2/2016 |
| TW | I562922 | 12/2016 |
| TW | 201730032 | 9/2017 |
| TW | 201801969 A | 1/2018 |
| TW | M562805 | 7/2018 |
| TW | M575784 U | 3/2019 |
| WO | 2016029301 | 3/2016 |

OTHER PUBLICATIONS

Fox Transfer Hydraulic Infinite Adjust Seat Post, information found online at https://www.ridefox.com/family.php?m=bike&family=seatpost 2020.

KS Suspension LEV Intergra dropper post, information found online at https://www.kssuspension.com/product/lev-integra/ 2020.

9point8 the Fall Line dropper post, information found online at https://www.9point8.ca/index.php?route=product/product&path=42&product_id=213 2020.

Contact SL Switch Seatpost. Online at <https://www.giant-bicycles.com/ca/contact-sl-switch-seatpost> 2019.

(56) References Cited

OTHER PUBLICATIONS

RASE Components, LLC Launches the Mamba Rapid Adjust Seatpost. Online at https://www.pinkbike.com/news/rase-mamba-rapid-adjust-post-2008.html 2019.
Translation of Office action issued Mar. 3, 2022 in related ROC (Taiwan) Pat. Appln, No. 109111138.
Translation of Office action issued Nov. 17, 2021 in related ROC (Taiwan) Pat, Appln, No. 109111138.
Crankbrothers Kronolog Adjustable Seat Post. Online at <https://www.pinkbike.com/news/Crankbrother-Kronolog-Adjustable-Seat-Post.html> 2019.
Third party prior art submission made to German patent office dated Feb. 9, 2022 regarding related German application No. 10 2020 109 014.5, including references i) TW I562922, ii).
Notice of third party opinion art submission made to TW IPO dated Sep. 1, 2021 in related ROC (Taiwan) Pat. Appln. No. 109111138.
Third Party Submission of Prior Art on Jan. 28, 2022 in related Canadian application No. 3,077,761.
A webpage entitled "Model: 2017 LEV/LEV 272" showing product specifications and figures of a bicycle seat tube provided by Kind Shock Hi-Tech Co., Ltd. and downloadable from the Wayback Machine at https://web.archive.org/web/20170610095807/kssuspension.com/wp-content/uploads/2016/12/2017-Lev-drawing.pdf, available at least as early as Jun. 10, 2017.
A webpage entitled "Model: LEV 272" showing an exploded view of a bicycle seat tube provided by Kind Shock Hi-Tech Co., Ltd. and downloadable from the Wayback Machine at https://web.archive.org/web/20170629100108/http://kssuspension.com/wp-content/uploads/2015/12/LEV-272.PDF, available at least as early as Jun. 10, 2017.
2018 LEV dropper post drawings from Kind Shock Hi-Tech Co., dated Jan. 4, 2018.
Office Action (Notice of Allowance and Fees Due (PTOL-85)) dated Feb. 23, 2024 for U.S. Appl. No. 17/959,258 (pp. 1-15).
Office action issued on TW112111622 on Apr. 8, 2024.
Office Action (Notice of Allowance and Fees Due (PTOL-85)) dated Mar. 14, 2024 for U.S. Appl. No. 17/949,587 (pp. 1-4).
Office action issued on TW112129711 on May 14, 2024.
Office Action (Notice of Allowance and Fees Due (PTOL-85)) dated May 23, 2024 for U.S. Appl. No. 18/344,452 (pp. 1-7).
Office Action (Notice of Allowance and Fees Due (PTOL-85)) dated May 30, 2024 for U.S. Appl. No. 17/959,258 (pp. 1-4).
RockShox Reverb Review, article available online as of Nov. 30, 2011, at https://www.pinkbike.com/news/rockshox-reverb-review-2011.html.
BikeYoke Revive Dropper Post Reviewed, article available online as of Feb. 5, 2019 at https://nsmb.com/articles/bikeyoke-revive-dropper-post-reviewed/.
Fox Transfer Dropper Seat Post—Review, article available online as of Jun. 7, 2016 at https://www.pinkbike.com/news/fox-transfer-dropper-seat-post-review-2016.html.
OneUp Componets Press Release entitled "OneUp Components Dropper Post", dated Apr. 15, 2018, 9 pages, retrieved at <https://www.vitalmtb.com/news/press-release/0 NEU P-CO M PONE NTS-D ROPP E R-POST,2096#:-: Text= The%20world's % 20shortest, %20long%2olong%travel%20dropper> (Year:2018).
OneUp Components Vimeo video and description entitled "OneUp Components Dropper Post Shim Install", dated May 16, 2018, 1 page plus 26 pages of video screenshots, retrieved at <https://vimeo.com/270135438> (Year:2018).

* cited by examiner

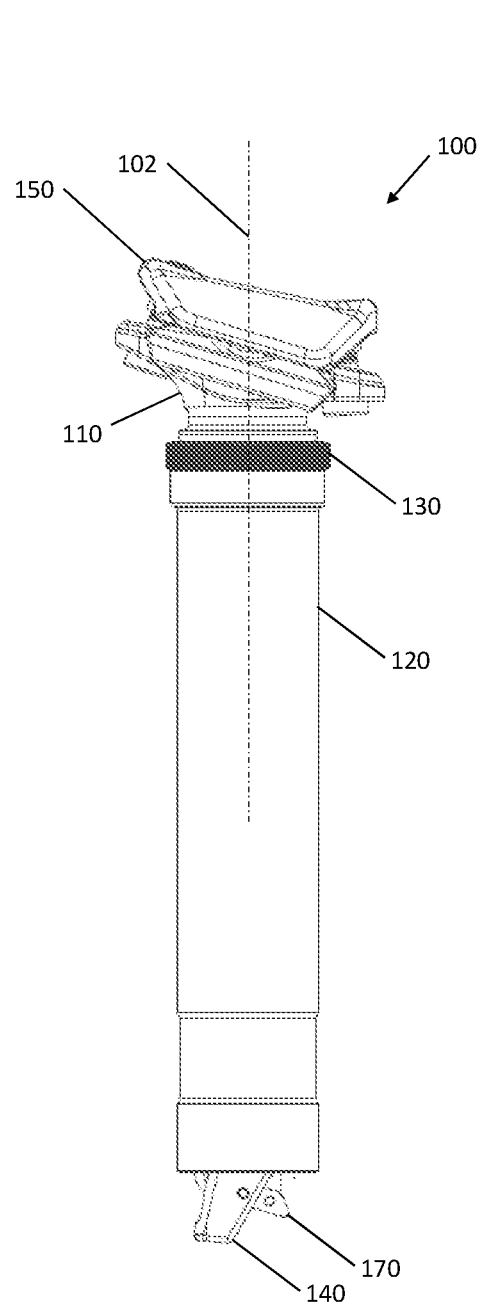
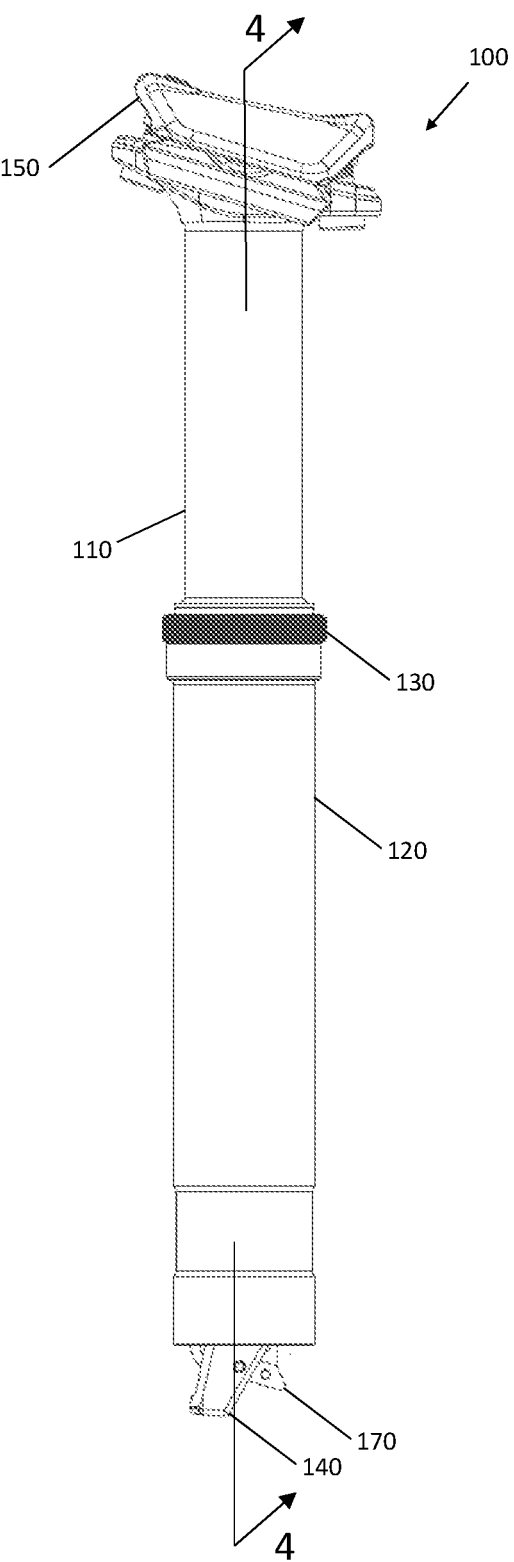
FIG 1.
FIG 2.

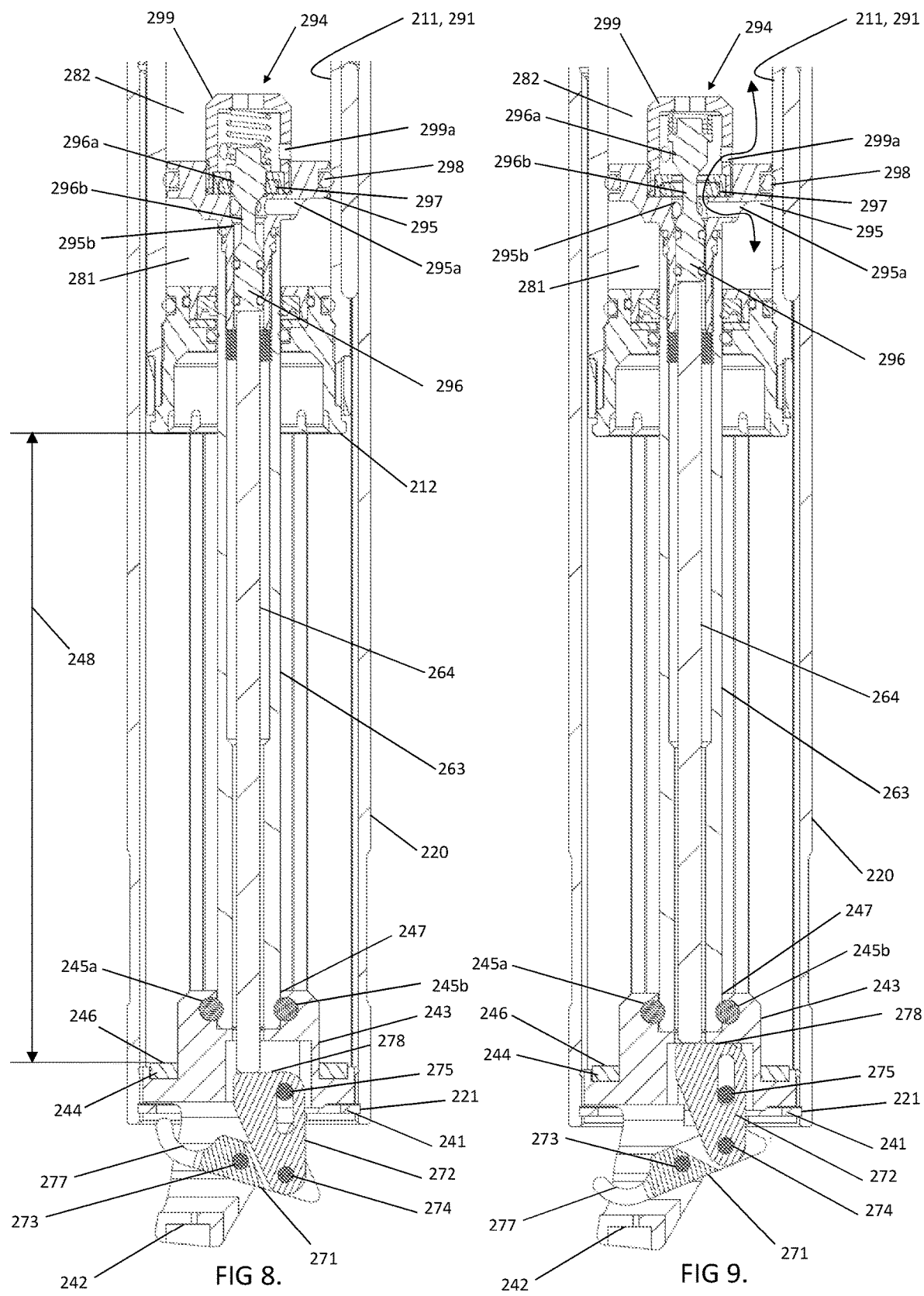

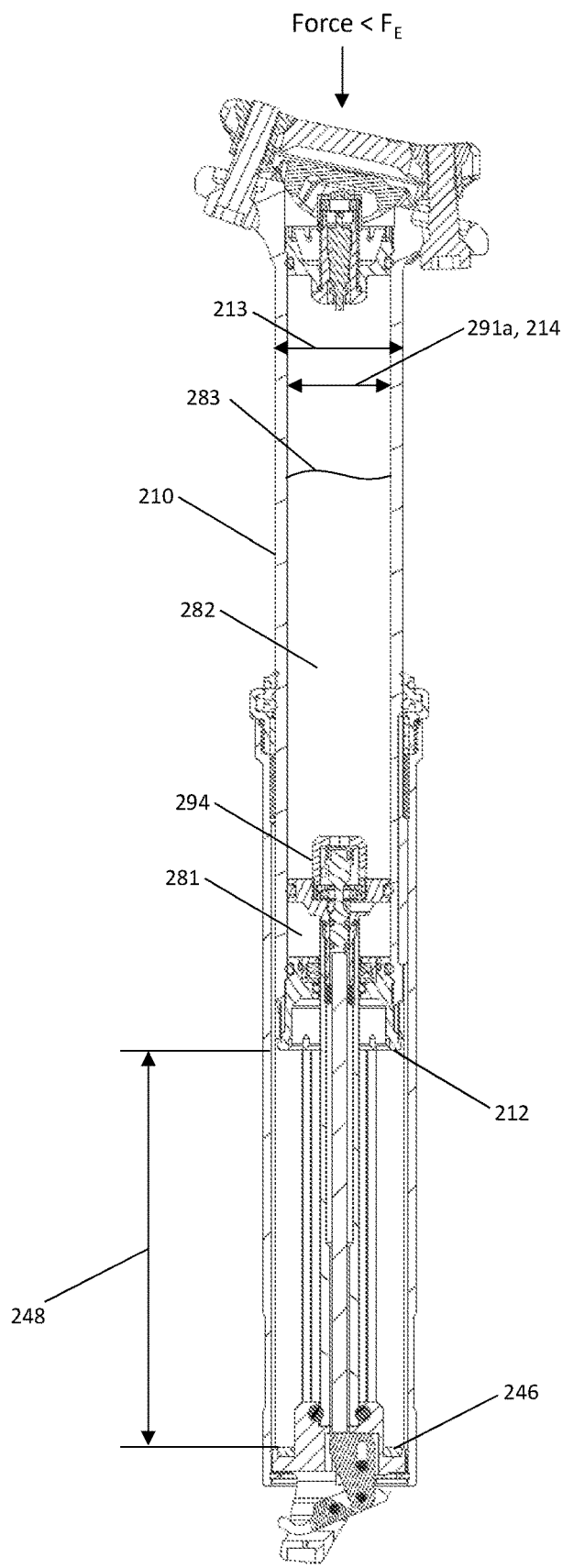
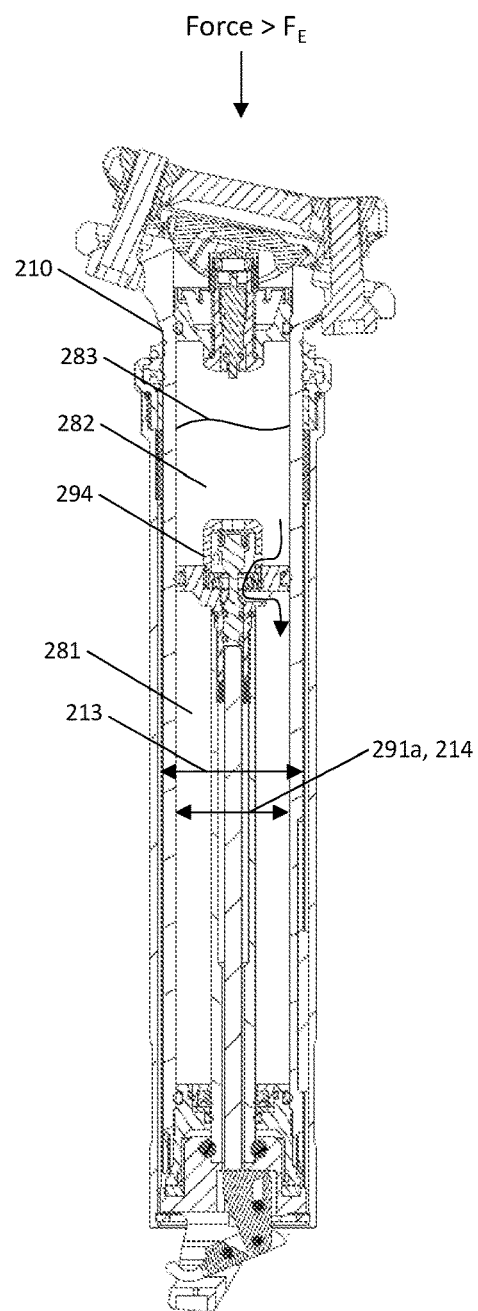
FIG 10.                    FIG 11.

BICYCLE DROPPER SEAT POST ASSEMBLY WITH A LOCKING SPRING CARTRIDGE

CROSS-REFERENCE TO RELATED APPLICATION

This present application is a continuation of U.S. patent application Ser. No. 17/495,925 filed Oct. 7, 2021 and entitled Bicycle Dropper Seat Post Assembly With A Locking Spring Cartridge and issued as U.S. Pat. No. 11,767,073, which claims priority to and the benefit of U.S. provisional patent application No. 63/089,738 filed on Oct. 9, 2020, and entitled Bicycle Seat Post Locking Return Spring, the entirety of which is hereby incorporated by reference.

TECHNICAL FIELD

The present invention relates to a locking spring cartridge used to control the height of a dropper seat post on a bicycle, and a dropper post assembly including the same.

INTRODUCTION

U.S. Pat. No. 5,881,988 discloses a seat assembly includes a seat tube in which a seat post is movably received therein which has a clamping member with a seat disposed thereto. The seat post has two plain portions defined diametrically opposite in an outer periphery thereof and the seat tube has two wedge-shaped recesses defined diametrically opposite in an inner periphery thereof so as to receive two wedge-shaped blocks therein. The seat post extends through a nut member which is threadedly mounted to the seat tube.

U.S. Patent Publication No. 2020/070913 discloses a bicycle seat post assembly in which the travel distance of the seat post can be adjusted. The seat post assembly includes an outer tube that is configured to telescopically receive an inner tube. The inner tube is axially slidable relative to the outer tube between a retracted position and an extended position, the extended position being determined by an extension assembly in which an inner contact member engages an outer contact member, thereby setting the upper limit of axial extension of the inner tube. The extension of the inner tube can be limited to an intermediate position that lies between the retracted and extended positions by an insertable shim that is positionable between the inner and outer contact members.

Taiwan patent publication no. TW201801969A discloses a casing gap filling structure for a bicycle seat tube, which comprises a casing set having an outer tube and an inner tube which are sleeved onto each other and move linearly; a rotation constraining set which is arranged between the inner tube and the outer tube and provided with a first constraining groove arranged on the inner diameter edge of the outer tube and a second constraining groove arranged on an outer diameter edge of the inner tube, the first and second constraining grooves forms a constraining space together, and at least one metal constraining member made of a metal material is accommodated in the constraining space and capable of conducting synchronous linear displacement with the inner tube; a gap filler set is disposed in the constraining space and provided with at least one plastic constraining member made of a plastic material, the gap filler set and the metal constraining member respectively overlapping with each other in the constraining space along the axial direction of the inner and outer tubes, and the plastic constraining member is able to effectively fill the constraining space so as to eliminate the gaps among the plastic constraining member and the first and second constraining grooves; in this way, the rotation constraining set and the gap filler set are used to achieve the dual function of constraining the rotation and eliminating the gaps between the inner tube and the outer tube at the same time. The manufacturing cost of the filling structure is low because the overall components are simple and easy to be assembled quickly. Further, the gaps among the components generated by the fit tolerance and the manufacturing tolerance are reduced with no requirement of tight rotation actions, the automatic filling function is thus achieved and compatible with the lifting seat tube and the suspension seat tube.

U.S. Pat. No. 10,974,781 discloses a bicycle seat post assembly in which the travel distance of the seat post can be adjusted. The seat post assembly includes an outer tube that is configured to telescopically receive an inner tube. The inner tube is axially slidable relative to the outer tube between a retracted position and an extension position, the extension position being determined by an extension assembly in which a slider engages an upper retainer surface, thereby setting the upper limit of axial extension of the inner tube. The extension of the inner tube can be limited to an intermediary extension position that lies between the retracted and extension positions by an insertable extension stopper that is positionable under the upper retainer surface.

Taiwan utility model publication no. TWM517710U discloses a bicycle gas hydraulic seat tube assembly related to bicycles, especially a bicycle hydraulic pressure seat tube assembly. The common gas-oil seat tube adopts the gas compressible characteristic to match the flow of hydraulic oil in the space, so that the relative position change between the seat tube and the seat post is achieved, thereby achieving the effect of adjusting the height of the seat cushion. For example, as disclosed in the Republic of China Announcement No. M332057, the upper and lower displacements of the valve stem are used to switch the flow state of the adjustment flow path, so that the seat tube can achieve the effect of adjusting the height. However, in the aforementioned patent case, the inner and outer spaces for storing the hydraulic oil are disposed between the relatively exposed seat tube and the adjustment seat, and are not located in the relatively closed riser. The risk of leakage is therefore necessary for structural improvements. The main purpose of this creation is to provide a bicycle gas pressure seat tube assembly that reduces the risk of oil and gas leakage.

SUMMARY

Dropper seat posts are telescopic posts that allow the rider to change the height of their seat without having to stop and adjust a mechanically tightened seat post collar. It can be generally advantageous to lower the bicycle seat as far as possible when riding through technical terrain to allow the rider to change body position or bend their knees deeply without contacting the seat.

Some known dropper post locking spring cartridges are configured with two or more chambers containing liquid (i.e. hydraulic oil), gas (i.e. air) or a combination thereof. There is typically an internal piston valve controlled by an actuator/remote and an actuation rod translatable between an open and a closed position. When the piston valve is closed and a rider sits on a seat attached to the top of the post, the chamber containing, by design, only oil is placed in compression thereby allowing the post to be loaded without retracting.

In this configuration, when the piston valve is opened the piston travels into the oil only chamber. Because the oil in the oil only chamber is substantially incompressible it is typically more difficult to open the valve while the upper tube is being urged toward the retracted position. This causes the rider to have to exert more force on the actuator/remote than may be comfortable, and/or that may put unwanted loads on the actuator system, in order to overcome this resistance and open the valve.

In this configuration, if the rider sits down on the seat too fast/hard while the piston valve is locked (closed), for example if a rider were to have one or both feet slip off the pedals and fall onto the seat with substantially all of their body weight, the seat post would generally not retract and therefore the seat would not move/lower to absorb and the rider could be injured by the seat and/or cause damage to the dropper post or seat.

Also, in this configuration air can sometimes enter the oil only chamber unintentionally. Once there, the presence of the relatively compressible air/gas within the chamber that is intended to contain only oil/liquid may allow the post to compress slightly under a relatively low force while the piston valve is, and remains, locked. This relatively-low force sponginess is seen by consumers as being generally undesirable and as an indicator of a low-quality design. Correcting and a generally expensive and/or complicated rebuild is required fix the problem.

Accordingly, there remains for a dropper post, including a suitable spring cartridge device, in which the actuation force of the spring cartridge device is not materially affected by the instantaneous load that is being applied to the seat (e.g. can operate in substantially the same way when the seat is loaded or unloaded), and where, when the piston valve is closed, the upper tube remains sufficiently rigid to resist loading of the seat up to a pre-determined, overload force above which the post can compress slightly, in accordance with its cushion quotient, to help protect the post from damage and/or the rider from injury.

The foregoing examples of the related art and limitations related thereto are intended to be illustrative and not exclusive. Other limitations of the related art will become apparent to those of skill in the art upon a reading of the specification and a study of the drawings.

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

One aspect of the embodiments described herein provides a dropper post assembly for supporting a bicycle seat, the dropper post assembly comprising an outer tube extending along a post axis between a lower end and an upper end; an inner tube telescopically receivable in the outer tube and extending between an upper end that is connectable to a bicycle seat and a lower end that is disposed within the outer tube, the inner tube being axially slidable within the outer tube between a retracted position in which the lower end of the inner tube is proximate the lower end of the outer tube and an extended position in which the lower end of the inner tube is axially spaced from the lower end of the outer tube.

One aspect of the embodiments described herein provides a dropper post assembly where the inner tube has an outer diameter that is greater than about 25.5 mm One aspect of the embodiments described herein provides a dropper post assembly where the moment of inertia of the inner tube taken in a plane adjacent the upper end of the outer tube and orthogonal to the post axis that is greater than 11,000 mm^4.

One aspect of the embodiments described herein provides a dropper post assembly with a locking spring cartridge comprising an axially extending cylinder a piston disposed within the cylinder, a first chamber containing oil only on a lower side of the piston, a second chamber containing a combination of oil and gas on an opposing, upper side of the piston; and a valve that is configurable in an open position in which fluid communication is established between the first chamber and second chamber and a closed position in which the first chamber is fluidly isolated from the second chamber; the cartridge configured so that moving the inner tube toward the retracted position expands the first chamber One aspect of the embodiments described herein provides a dropper post assembly with an extension force used to extend the post when unweighted and an extension force multiplier that defines the degassing point of the hydraulic fluid in tension and wherein the assembly is configured so that the force multiplier is between about 3 and about 6.

One aspect of the embodiments described herein provides a dropper post assembly with a moment of inertia of the inner tube taken in a plane adjacent the upper end of the outer tube and orthogonal to the post axis and an extension force multiplier that defines the degassing point of the hydraulic fluid in tension and wherein the assembly defines a cushion quotient. The cushion quotient defined by the moment of inertia in mm^4 divided by the extension force multiplier and is greater than about 2700 mm$^4$.

In accordance with one broad aspect of the teachings herein, a dropper post assembly for supporting a bicycle seat can include an outer tube extending along a post axis between a lower end and an upper end comprising a seat collar. An inner tube may have an upper end that is connectable to a bicycle seat and a lower end that is axially spaced from the upper end and is disposed within the outer tube, and may be configured to be axially slidable within the outer tube by a travel distance that is at least 200 mm between a retracted position in which the lower end of the inner tube is proximate the lower end of the outer tube and an extended position in which the lower end of the inner tube is axially spaced from the lower end of the outer tube. The inner tube may have an outer diameter that is between 25.5 mm and 30 mm, and when the inner tube is in the extended position a moment of inertia (Ix) taken in a plane that is orthogonal to the post axis, and adjacent the seat collar is at least 11,000 mm$^4$. A spring cartridge may include an axially extending cylinder disposed within the upper tube and a piston movably received within the cylinder. The spring cartridge may have an unlocked configuration in which the spring cartridge exerts an extension force (FE) on the inner tube that biases the inner tube toward the extended position, and a locked configuration in which the spring cartridge is operable to generate a degassing force (FD) of between about 90 lbs and about 140 lbs to resist movement of the inner tube toward the retracted configuration. An actuator may have a body disposed at the lower end of the outer tube and may be operable to change the spring cartridge between the locked configuration and the unlocked configuration.

The degassing force divided by the extension force defines a force multiplier $M_F$ ($M_F=F_D/F_E$), and dividing the moment of inertia by the force multiplier defines a cushion quotient $Q_C$ ($Q_C=I_x/M_F$), and the cushion quotient may be at least 2400 mm$^4$.

The force multiplier may be between about 3 and 6.

The force multiplier may be between 4 and 5.

The cushion quotient may be at least 2600 mm⁴.

The degassing force may be equal to or less than 100 lbs, and the extension force may be between about 15 lbs and about 35 lbs.

The cylinder may include an inward facing sliding surface and the piston may slidably seal against the sliding surface thereby dividing the cylinder to provide a first chamber containing a liquid and disposed on a lower side of the piston, and a second chamber and disposed on an opposing, upper side of the piston, whereby moving the inner tube toward the retracted position expands the first chamber.

The second chamber may contains a combination of the liquid and a gas at an operating pressure that is between about 200 psi and about 300 psi.

The spring cartridge may include a cartridge rod extending from the piston through the first chamber, and a valve that is configurable in an open position in which fluid communication is established between the first chamber and second chamber and the cartridge is in the unlocked configuration, and a closed position in which the first chamber is fluidly isolated from the second chamber and the cartridge is in the locked configuration. An actuation rod may extend from the body of the actuator and through the cartridge rod to the valve and operable to selectably open and close the valve.

The sliding surface defines a sliding surface diameter ($D_S$) may be between about 18 mm and about 25 mm and the cartridge rod may have a cartridge rod diameter ($D_R$). A ratio of the sliding surface diameter to the cartridge rod diameter ($D_S:D_R$) may be between about 1.8 and about 4.17.

The degassing force divided by the extension force defines a force multiplier MF (MF=FD/FE) and wherein the force multiplier may be within about 10% of 3.72(Ds/DR)−5.59.

The cartridge rod diameter may be between about 7 mm and about 9 mm.

The valve may include a valve body formed in the piston and a plunger that seals against the valve body when the valve is in the closed position and that is translatable relative to the valve body and into the second chamber to change the valve to the open position. A plunging force required to translate the plunger relative to the valve body may be substantially constant regardless of the axial position or loading of the inner tube.

The plunging force required when the inner tube is subjected to an axial load may be within about 10% of the plunging force required to translate the plunger relative to the valve body is when the inner tube is unloaded.

The cylinder may be integrally formed with the inner tube, whereby the inner tube comprises the sliding surface.

The cylinder may include an outer cartridge tube that is disposed within and is connected to translate with the upper tube.

The moment of inertia may be greater than 13,000 mm⁴.

The inner tube may have an inner diameter that is less than 82.5% of the outer diameter.

BRIEF DESCRIPTION OF THE DRAWINGS

FIG. 1 is a side view of one example of a dropper post in a retracted position;

FIG. 2 is a side view of the dropper post of FIG. 1 in an extended position;

FIGS. 8 and 9 are enlarged views of another portion of the cross-sectional view of FIG. 6;

FIGS. 10-13 are additional cross-sectional views of dropper post of FIG. 6.

DESCRIPTION

Figure 3:
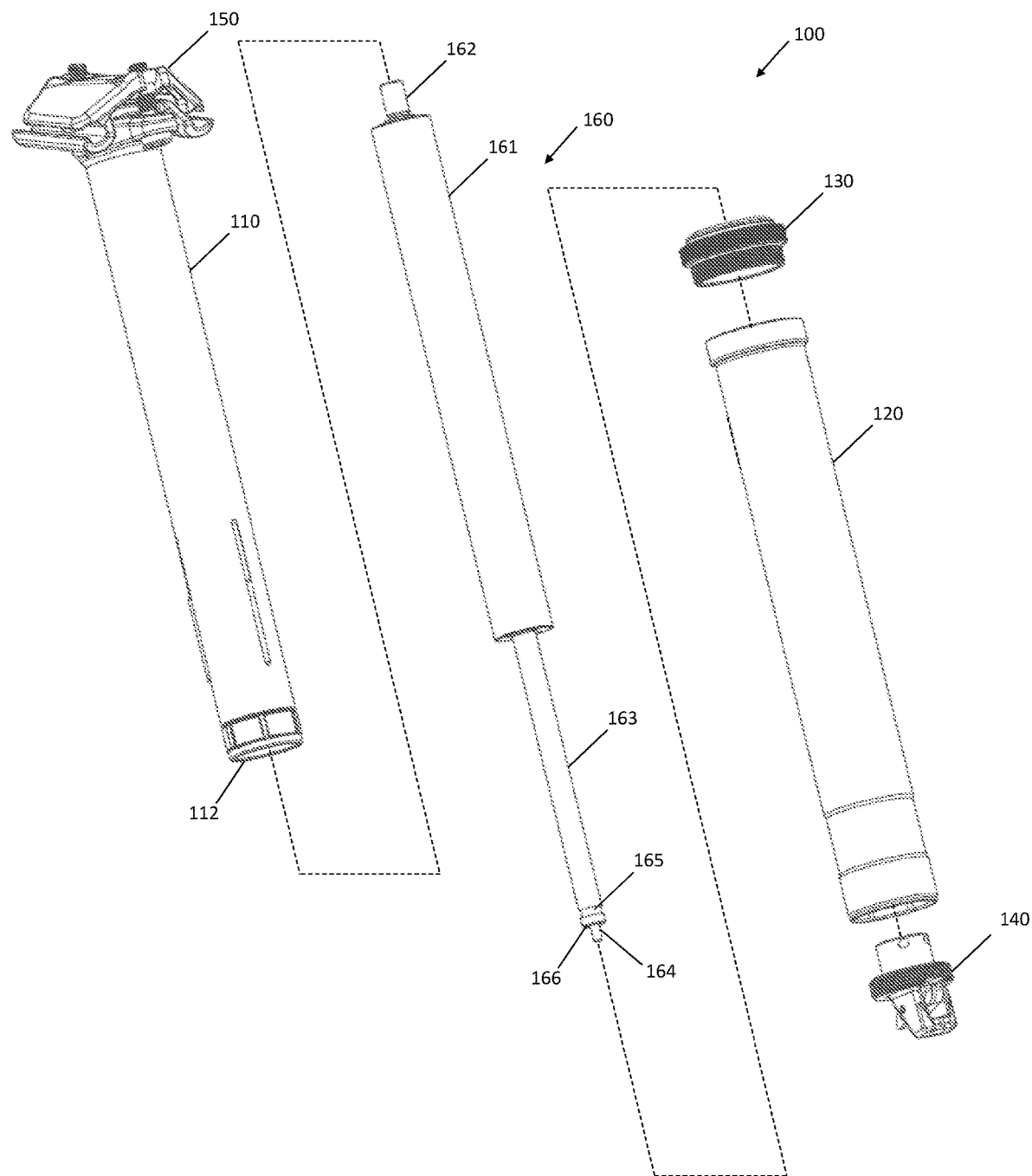
FIG. 3 is a partially exploded view of the dropper post of FIG. 1.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Bicycle dropper seatposts allow a rider to change the height of their seat while riding without having to stop and adjust a mechanically tightened seat post collar. Dropper seat posts are available in different sizes, having different lengths of travel and different minimum and maximum seat heights. The dropper posts can include a lower or outer tube that can be connected to a bicycle, and an upper or inner tube that is telescopically slidable relative to the outer tube. A bicycle seat is connectable to the upper end of the inner tube, using a suitable clamping mechanism, and the lower end of the inner tube is usually nested within the outer tube. The inner tube is movable, relative to the outer tube, between a retracted position (in which the seat is relatively closer to the bicycle and most of the inner tube is received within the outer tube) and at least one extended position (in which the seat is relatively farther from the bicycle and a significant portion of the inner tube is exposed and extended outside the outer tube).

To help facilitate the desired extension and retraction of the inner tube, dropper seatposts can also include a biasing and locking mechanism that can be used to urge/bias the inner tube toward at least one of the retracted or extended positions, and can also help secure the inner tube in place—such as in its extended position—if the rider wishes to keep the seat at a given height/position. Preferably, the biasing and locking mechanism can be arranged to bias the inner tube (and seat mounted thereon) to its extended position, and then maintain the inner tube in this position until the rider chooses to have the inner tube retracted. In the embodiments described below, the biasing and locking mechanism includes a locking spring cartridge.

Preferably, the dropper seatposts also include some type of actuator mechanism that a rider can use to actuate/trigger the biasing and locking mechanism, so as to allow the rider to selectably alter the seat height. For example, the dropper seat post can include an actuator assembly that is used to trigger and/or selectable lock and unlock the locking spring cartridge. The locking spring cartridge, as described herein, can be configured so that it remains fixed/lock when not engage by the actuator assembly, and will stay in either its extended or retracted configuration. The locking spring cartridge is preferably biased toward its extended configuration, whereby if the locking spring cartridge is retracted and is then unlocked by the rider via the actuator, the locking spring cartridge can apply a biasing, extension force that urges the inner tube (and seat) toward its extended position—thereby raising the seat. With the actuator disengaged, the locking spring cartridge is considered locked and will resist movement/retraction of the inner tube. That is, the locking spring cartridge force will resist the axial/vertical loads on the inner tube while in use to help keep the seat at the desired height, but the resistance of the locking spring cartridge may be overcome if a sufficiently large axial/vertical force is applied. Allowing the locking spring cartridge to yield in response to an overload situation (e.g. when the applied force passes a predetermined load threshold), while remaining sufficiently rigid when subjected to loads below the predetermine load/yield threshold may be advantageous because it can allow the post to support the weight of the rider when in use (in a manner that is perceived to be stable by the rider), while allowing the post to yield when overloaded to avoid damaging or bending portions of the post or injuring the rider. Having a cushion quotient, Qc, that is sufficiently high can help achieve this desired performance.

When a rider wishes to lower the seat height, the actuator is engaged and the rider can apply a downward force on the seat (typically using their body weight) that is sufficient to overcome the biasing force of the locking spring cartridge so that the inner tube can be retracted into the outer tube. Once retracted, the actuator is disengaged, thereby locking the locking spring cartridge and keeping the inner tube in its retracted position. In this arrangement, the biasing force of the locking spring cartridge when unlocked is preferably set relatively low so that the inner tube can be retracted using the body weight of the rider (and of riders of potentially different sizes and weights), whereas the force required to cause movement of the locking spring cartridge when it is locked is relatively higher, but below the predetermined threshold.

To make things convenient for the rider, the triggering mechanism/remote for the actuator assembly can be provided at another location on the bicycle, such as on the handlebars, and can be operatively connected to a the actuator assembly by a remote connector (such as a wire, cable, chain, level, pneumatic or hydraulic link or the like). Because such remotes are usually connected to the actuator assembly in a mechanical/fluid power manner that transmits forces back to the user, it is preferable that the force required to engage the actuator assembly remains in a range that is feasible/comfortable for the rider to apply using the remote, and more preferably the force required to engage the actuator assembly remains relatively constant whether the inner tube is extended or retracted. This may help provide a more consistent tactile experience for the rider.

The inventor has determined that the extension force, overload yield force and other parameters of the dropper post can be configured by modifying aspects of the locking spring cartridge design, such that a new dropper post has been created in which the actuation force of the spring cartridge device is not materially affected by the instantaneous load that is being applied to the seat (e.g. can operate in substantially the same way when the seat is loaded or unloaded), and/or where, when the spring cartridge is locked (e.g. the piston valve is closed), the upper tube can remain sufficiently rigid to resist loading of the seat up to a pre-determined, overload force above which the post can compress slightly to help protect the post from damage and/or the rider from injury. Examples of suitable locking spring cartridges that can be used in such dropper posts are described herein.

FIGS. 1-5 illustrate one example of a dropper seat post 100 includes an inner tube 110, seat clamps 150 (for connecting to a bicycle seat—not shown), an outer tube 120, a seat collar 130, an actuator assembly 140, including actuator mechanism 170, and a locking spring cartridge 160. In this arrangement, both the inner tube 110 and outer tube 120 are elongate, tubular members that extend along a post axis 102. While the post axis 102 is shown as generally vertical in FIGS. 1 and 2, when the dropper post 100 is in installed on a bicycle the post axis may be inclined and need not be vertical.

Figures 4, 5:
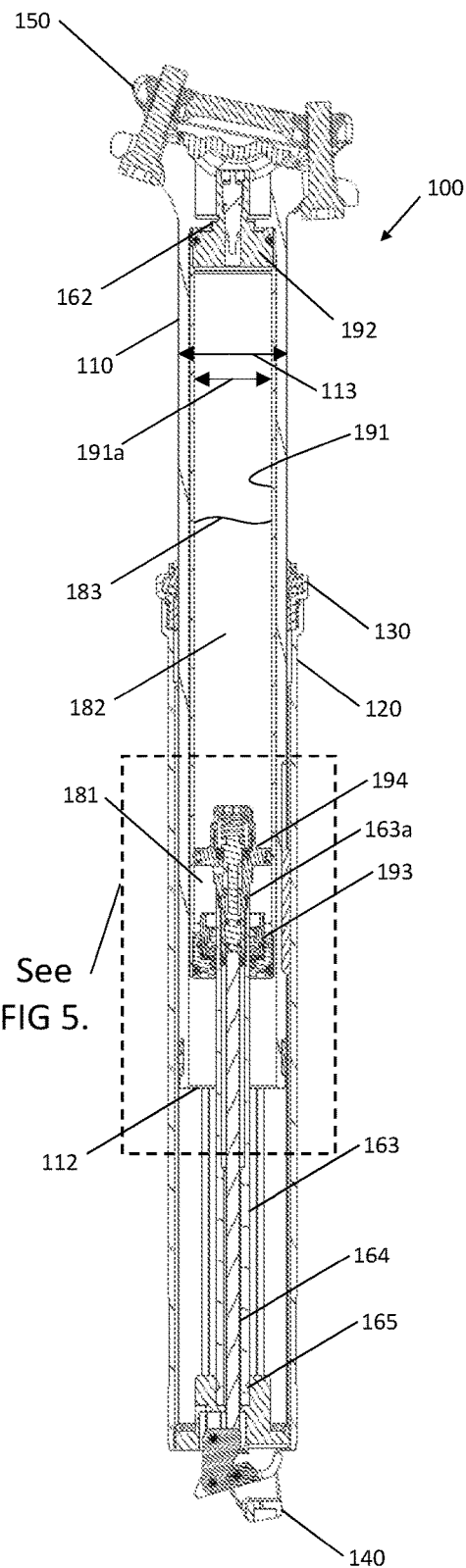
FIG. 4 is a cross-sectional view of the dropper post of FIG. 2, taken along line 4-4.
FIG. 5 is an enlarged view of a portion of the cross-sectional view of FIG. 4.

In this example, the inner tube 110 is configured to slide telescopically within the outer tube 120 between a retracted position (FIG. 1) and an extended position (FIGS. 2 and 4, for example). The inner tube 110 includes a lower end 112 that is sized to fit within the outer tube 120 and that is intended to be retained within the outer tube 120 in both of the seat post's 100 retracted (FIG. 1) and extended configurations (FIG. 2). The inner tube 110 also has sidewall with an inner wall surface 111, and defines an inner tube outer diameter ($D_{TO}$) 113 and inner tube inner diameter ($D_{TI}$) 114. While the term inner tube diameter is used for convenience in this description, it is possible in some examples that the inner wall does not have a circular cross-sectional shape, and may have an oval shape, rectangular shape or other suitable shape, even if the outer shape is circular or substantially circular. As described herein, the interior of the upper tube is preferably sized to accommodate the associated spring cartridge (as described herein) and can influence the formula that is used to calculate its movement of inertia (as described herein), but the values for the moment of inertia can be compared for different shapes. Therefore, references to inner diameters can be understood to mean inner width and/or other relevant interior measurement that is useful for calculating the moment of inertia for a given shape. The term diameter is not intended to limit the present teachings to only be applicable to posts with a circular interior shape.

Referring to FIGS. 3-5, one example of a locking spring cartridge 160 that is suitable for use with the dropper posts described herein includes a cartridge outer tube 161 that has a sidewall with an inner surface that can be engaged by portions of the cartridge and can form part of the boundary of internal cartridge chambers and/or may be part of the sealing structures. In this example, the inner surface of the cartridge outer tube 161 can be referred to as an inner sliding surface 191 that defines a sliding surface diameter 191a. The cartridge outer tube 161 is preferably connectable to the inner tube 110 in a manner that is sufficiently strong enough to carry the forces described herein, and that allows the inner tube 110 to move with the cartridge outer tube 161. In the illustrated example, the cartridge outer tube 161 includes upper connection portion 162 for attaching cartridge 160 to upper tube 110, but other fasteners could be used. In addition to the cartridge outer tube 161, the locking spring cartridge 160 also includes a cartridge rod 163, a locking groove 165 and actuation rod 164. Fixedly attached to sliding surface 191 are upper seal head 192 and lower seal head 193, which together help seal in the interior of the cartridge outer tube 161 and substantially fluidly isolate the interior of the cartridge outer tube 161 from the surrounding environment (at least with a sufficient degree of sealing/isolation to facilitate the operation of the locking spring cartridge 160 as described herein).

Within the interior of the cartridge outer tube 161 a piston assembly is provided to separate the interior of the cartridge outer tube 161 into two different chambers, and to help facilitate the translation of the cartridge outer tube 161 as described. The piston assembly can be of any suitable configuration that can operate as described herein. A valve mechanism is also preferably provided that can selectably allow fluid communication between the chambers on opposite sides of the piston assembly, as this can be used to lock and unlock the locking spring cartridge 160. The valve, and related fluid flow path regions, can be of any suitable configuration. To help reduce the overall size of the locking spring cartridge 160, it may be preferable to integrate a suitable valve mechanism within the piston assembly, as is shown in the present example that includes a piston valve 194 attached to the upper end 163*a* of a cartridge rod 163 that can extend from the piston valve 194 to the actuator assembly 140. The piston valve 194 is sized to generally fill the cartridge outer tube 164, is positioned axially between the upper and lower cartridge seal heads 192 and 193, and has a sealing portion that is positioned opposite and configured to seal against the sliding surface 191 and includes a body-sliding-surface o-ring 198 (or other suitable translatable sealing member). The piston valve 194, in this example, also includes a valve body 195, a plunger 196 that can move relative to the valve body 195, a body-piston o-ring 197, and valve cap 199. In this embodiment the valve cap 199 defines a valve cap channel 199*a* and the valve body 195 defines a corresponding valve body channel 195*a* and a valve inner pathway 195*b*. The plunger 196 includes a seal surface 196*a*, that can seal against the valve body 195 (e.g. against o-ring 197 in this example) to inhibit fluid flow through the piston valve, and neck portion 19*b*.

In this arrangement, the piston 194 divides the interior of the cartridge outer tube 161 into two operating chambers that can be fluidly isolated from each other while the locking spring cartridge 160 is in use to selectably lock and unlock the locking spring cartridge 160. For example, when the operating chambers are fluidly isolated from each other the locking spring cartridge 160 can be considered to be in a locked configuration, and will resist movement of the cartridge outer tube 161 and seat post inner tube 110. In contrast, when the operating chambers are fluidly connected, such as by activating the piston valve 194 and allowing fluid (liquid) to pass through the piston 194 and flow between the operating chambers, the locking spring cartridge 160 can be considered to be in an unlocked configuration, and will facilitate the relative movement of the cartridge outer tube 161 and seat post inner tube 110 relative to the outer tube 120. As described herein, when the locking spring cartridge 160 is in use, and the piston valve 194 is opened, the cartridge outer tube 161 can translate relative to the piston 194 to allow the seat post inner tube 110 to translate relative to the outer tube 120.

Referring to FIGS. 4 and 5, in this example one, or a first, of the operating chambers is chamber 181, which is located axially between the piston valve 194 and the lower seal head 193 and is laterally bounded the sliding surface 191. Preferably, the lower chamber 181 is configured to contain only, or at least substantially only liquid, such as the oil described herein, rather than a mixture of liquid and gas or other material and can also be referred to as a liquid chamber. When the locking spring cartridge 160 is in use within the seat post 100 in the orientation illustrated these Figures (which is also the orientation of the locking spring cartridge 160 when it is in use on a bicycle) the chamber 181 can be referred to as a lower chamber 181, but it is understood that the term lower is used for convenience and is not intended to limit the orientation of the locking spring cartridge 160 when in use.

In the present example, the other, or second, operating chamber is chamber 182 which is located axially between the piston valve 194 and the upper seal head 192 and is also laterally bounded by the sliding surface 191. Because of its relative location within the locking spring cartridge 160 as illustrated, the second chamber 182 can be referred to as an upper chamber 182, but it is understood that the term lower is used for convenience and is not intended to limit the orientation of the locking spring cartridge 160 when in use. In contrast to lower chamber 181, the upper chamber 182 is preferably configured to contain a mixture of oil (or other suitable liquid) and pressurized air (or other suitable gas), instead of containing only oil/liquid, and can be referred to as a gas/liquid chamber.

Under the intended operating conditions of the locking spring cartridge 160 the oil and air (or other liquid and gas) in the gas/liquid chamber 182 with tend to separate from each other due the differences in their densities and mechanical properties, such that an air/oil interface or boundary 183 is defined between piston valve 194 and upper seal head 192 within chamber 182. In this arrangement, the gas/liquid chamber 182 will have a lower layer or region containing oil occupying the space located axially between the boundary 183 and the piston valve 194, and an upper layer or region that is above the oil layer and boundary 183 and is located axially between the boundary 183 and the upper seal head 192. When the piston valve 194 is actuated and its valve is open, fluid communication between the liquid layer within chamber 182 and the liquid within the lower chamber 181 is established.

While illustrated as separate members in this example of dropper seat post 100, the cartridge outer tube 161 and upper tube 110 may alternatively be integrally formed with each other and as is shown in another example of a dropper seat post 200. The seat post 200 is analogous to seat post 100 and like features are illustrated using like reference characters indexed by 100. As described further herein, seat post 200 can operate in substantially the same manner as seat post 100, but may have some slightly different components and configurations as a result of the integral formation of the cartridge outer tube 161 and upper tube 110 that do not materially alter how the posts 100 and 200 operate. For example, if the cartridge outer tube 161 and upper tube 110 are of integral, one-piece construction as shown in this second example then features such as the upper connection portion 162, that is used to connect the separate cartridge outer tube 161 to the upper tube 110 in the previous example, is not needed. Similar functioning components on dropper post 100 will now be described using characters indexed by 100 (i.e. 163 is now 263).

Figures 6, 7:
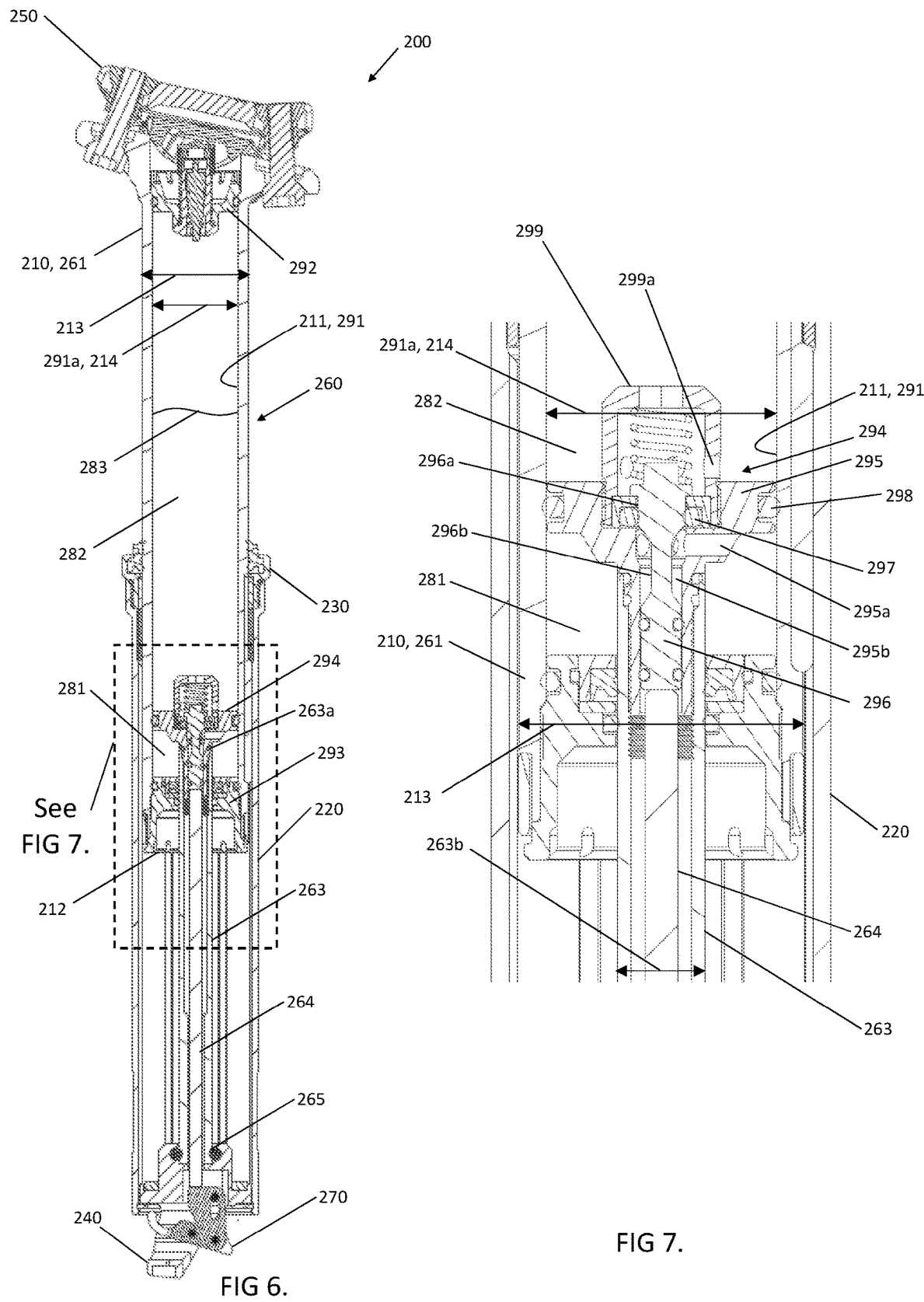
FIG. 6 is a cross-sectional view of another example of a dropper post.
FIG. 7 is an enlarged view of a portion of the cross-sectional view of FIG. 6.

FIGS. 6-7 illustrate an example of a dropper seat post 200 that embodies another preferred embodiment of the teachings described herein. In this example, the seat post 200 includes an inner tube 210, seat clamps 250, outer tube 220, seat collar 230, actuator assembly 240, including actuator mechanism 270. The inner tube 210 further includes lower end 212, inner wall surface 211, inner tube outer diameter (DTO) 213 and inner tube inner diameter (DTI) 214.

In contrast to the seat post 100, in this example the inner tube 210 and outer cartridge tube 261 are integrally formed together (i.e. are of integral, one-piece construction) so that the inner tube 210 forms a part of locking spring cartridge 260. This example of the locking spring cartridge 260 further includes an inner sliding surface 291 that defines a respective sliding surface diameter 291a (which is the same as tube inner diameter 214 in the case of dropper post 200), cartridge rod 263 defining a cartridge rod diameter 263b, locking groove 265 and actuation rod 264. Fixedly attached to sliding surface 291 are upper seal head 292 and lower seal head 293. While fixed during the operation of the locking spring cartridge 260 to help contain the liquid and gas within the cartridge tube 261, the upper and lower seal heads 292 and 293 (and analogous seals 192 and 193) can be removed for maintenance, assembly of the mechanism and for any other reason while the seat post 200 (or 100) is not in use.

In this example, the piston valve 294 is attached to the upper end 263a of cartridge rod 263 and is positioned so that it can seal against and slide relative to the sliding surface 291, and is located axially between the upper and lower cartridge seal heads 292 and 293. In this example, the sliding surface 291 is an inner surface of the inner tube 210.

Piston valve 294 further contains a valve body 295, a plunger 296, a body-piston o-ring 297, body-sliding-surface o-ring 298 (or other suitable sealing member) and valve cap 299. In this example, the valve (including the valve body 295, plunger 296 and related sealing members, etc.) are included as part of the piston that separates the chambers 281 and 282, which can help reduce the overall size of the dropper post 200. Alternatively, a different type of valve and liquid flow path may be provided that does not necessarily require the flow path to extend through the piston as illustrated.

Valve cap 299 defines a valve cap channel 299a and valve body 295 defines a valve body channel 295a and a valve inner pathway 295b. Plunger 296 further defines seal surface 296a and neck 296b. Lower chamber 281 located within sliding surface 291 and between piston valve 294 and lower seal head 293 contains only oil (or other suitable liquid). Upper chamber 282 that is bounded by the sliding surface 291 and located axially between piston valve 294 and upper seal head 292 preferably contains a mixture of oil (or other suitable liquid) and pressurized air (or other suitable gas). When dropper post 200 is in a substantially upright position (as illustrated in FIGS. 6 and 7), the oil and air in chamber 282 will tend to separate from each other, with the oil occupying the lower portion of the space adjacent piston valve 294 and the relatively less dense air occupying the upper portion of the chamber 282 space adjacent the upper seal head 292. An air/oil boundary 283 is therefore defined between piston valve 294 and upper seal head 292 within chamber 282.

FIGS. 8-9 show the actuator 240, and lockable spring cartridge 260 in use. While the operation of the actuator and cartridge is described with reference to the actuator 240, and lockable spring cartridge 260, actuator 140 and lockable spring cartridge 160 have substantially the same features and are operable in an analogous manner (regardless of whether the cartridge outer tube is a separate member or is integrally formed with the dropper post inner tube). Further, while a given actuator 240 is described for convenience, other suitable actuators may be used provided that they can selectably trigger the piston valve 294 (or 194) to enable the locking and unlocking of the spring cartridge.

In the illustrated examples, actuator 240 includes a body 243, a cartridge rod receiving portion 247 for attaching cartridge rod 263 to body 243, an inner tube stop surface 246 and an actuation mechanism 270 to push actuation rod 264. Upper tube stop surface 246 may exist on body 243 or as illustrated may be the upper surface of cushioning member 244.

Cartridge rod 263 can be attached to rod receiving portion 247 of actuator body 243 in any suitable manner. In the illustrated example bolts 245a and 245b are provided and interact with locking groove 265 to securely connect the cartridge rod 263 to the actuator body 243. Alternatively, other suitable methods such as threaded engagement, a press-fit, a deformation fit or the like could be used.

Actuator body 243 of actuator 240 can be attached to lower tube 220 using any suitable techniques or fasteners, and preferably may be removable connected to allow access to the interior of the lower tube 220. In the illustrated example, body 243 uses circlip 241 that engages with groove 221 of lower tube 220. Other suitable methods such as threads, a press-fit, a deformation fit or the like could be used.

To operate the piston valve 294, the actuator 240 can also include a suitable actuator mechanism 270, which in this example includes a lower arm 271 that has a dynamic cable stop surface 277. An upper arm 272 is linked to the lower arm 217 and includes an actuation rod contact surface 278 that is configured to engage the lower end of the actuation rod 264. Pivot pins 273 and 274 are used to connect the lower and upper arms 271 and 272 to the each other and to the body 243 and to facilitate the desired pivoting of the arms 271 and 272 when the actuator 240 is in use. An alignment pin 275 is used to help guide the movement of the upper arm 272, and preferably to limit movement of the upper arm 272 to a substantially axial translation as the pin 275 is captive, and slides within a corresponding slot in the upper arm 272.

In this example, the actuator mechanism 270 uses a cable and housing arrangement (not shown—but that can be connected to a suitable remote trigger unit) to lower the distance between static cable stop surface 242 of body 243 and dynamic cable stop surface 277 of lower arm 271 when tension is applied to the cable (i.e. to pull the cable stop surface 277 downwardly as illustrated in FIG. 8). Lowering the distance between cable stops 277 and 242 pivots lower arm 271 about pin 273 thereby pushing upper arm 272 upward while it pivots about pin 274. Upper arm 272 is aligned to body 243 by alignment pin 275.

When the lower arm 271 is pivoted in this manner in response to tension being applied on the actuating cable, the upper arm 272 moves upwardly and the actuation rod contact surface 278 pushes actuation rod 264 upward (as illustrated). Axial movement of the actuation rod 264 then causes a corresponding axial movement of the translating plunger 296 (upwardly as illustrated) thereby 'opening' the piston valve 294. FIG. 8 shows actuator assembly 240 in a relaxed (closed) position. FIG. 9 shows actuator mechanism 240 in an actuated (open) position. Because plunger 296 translates into the upper chamber 282 containing gas and oil, the gas can compress as the plunger 296 moves into the upper chamber 282 therefore the force required to move plunger 296 is less than it would be if attempting to translate into chamber that contained oil/liquid. This arrangement can help facilitate the actuating of the piston valve 294, via the translation of plunger 296, with a substantially constant amount of force being required regardless of the axial position and/or relative loading of the inner tube 210 (or 110), e.g. where a plunging force required to translate the plunger 296 when the inner tube 210 is subjected to an axial load is within about 20%, and preferably within about 10% or 5% of the force required to translate the plunger 296 when the inner tube 210 is loaded (whether measured as tension on the cable, axial force acting on the actuator rod 264, feedback experienced by a rider at the remote triggering unit, or the like).

Once actuated (opened) plunger 296 translates upward and seal surface 296a of plunger 296 unseats from o-ring 297 and the neck 296b is sufficiently smaller in diameter that it does not seal against o-ring 297. In this example, when the plunger 296 is translated in this way a fluid flow path (including channel 299a, pathway 295b and channel 295a) is established within the piston valve 294 and between the chambers 281 and 282, and they are in fluid communication with each other fluidly communicate. That is, oil from chamber 282 can travel through channel 299a, pathway 295b and channel 295a into chamber 281, and vice versa. As such when the piston valve 294 is actuated (open) relative axial movement is possible between cartridge rod 263 and inner tube 210. Relative axial movement between upper tube 210 and lower tube 220 is therefore also possible.

When cartridge 260 is actuated (opened), and inner tube 210 is urged towards its retracted position, it can reach a lower limit in outer tube 220 when upper tube lower surface 212 contacts upper tube stop surface 246. The travel or drop length of the post is then defined, in this example, by the distance 248 between lower end 212 of the inner tube 210 when it is in its extended position (FIG. 8) and the upper tube stop 246. The drop length is preferably long enough to allow the seat to be in a comfortable riding position when the dropper post is extended, and to be sufficiently lowered so as to not substantially interfere with the rider when the dropper post is retracted. In some examples, the drop length 248 can be at least 190 mm, 195 mm, 200 mm, 205 mm, 210 mm, 215 mm, 220 mm, 225 mm, 230 mm, 235 mm, 240 mm, 245 mm or more, and preferably may be between about 190 mm and about 230 mm, or between about 200 mm and about 225 mm.

If valve 294 remains open and the force urging tube 210 towards its retracted position ceases (e.g. if the rider is not sitting on the seat or otherwise pushing to try and retract the inner tube 210), then the locking spring cartridge 260 in this example will bias the inner tube 210 to extend with an extension force FE. In the illustrated configuration, the extension force FE is defined by the product of the air pressure P in chamber 182 and the cross-sectional area of rod diameter ($D_R$) 263b as shown in the following equation.

$$F_E = P \times \pi \left(\frac{D_R}{2}\right)^2$$

The inventor has determined that configuring the air within the second chamber 282 to be at a predetermined, operating pressure, can help dictate the magnitude of the extension force FE for a given spring cartridge geometry, which can in turn help determine the perceived stiffness of the dropper post and the yield force as described herein. The operating pressure can be varied based on the specific geometry of a given dropper post to help obtain the desired performance, but in the illustrated example can be about 300 psi, and in other examples may be equal or less than 300 psi, such as between 200 psi and 300 psi, and preferably between about 250 psi and about 300 psi. In other examples, the operating pressure and relevant diameters (e.g. 291a/214 and 263b) can be selected for a given arrangement so that the extension force $F_E$ and other relevant forces and ratios described herein fall within the desired ranges.

One example of a suitable operating pressure P for the gas within chamber 282 that can be used for exemplary description purposes is an operating pressure of about 300 psi, and one example of a suitable $D_R$ would be 8 mm (0.315 ") Therefore the $F_E$ calculation would be as follows:

$$F_E = 300 \times \pi \left(\frac{0.315}{2}\right)^2$$
$$F_E = 23.37 \text{ lbs}$$

The inventor has discovered that the extension force $F_E$ under these conditions is sufficient to overcome the anticipated friction between inner tube 210 and outer tube 220 while the inner tube 210 is moved toward its extended position, but is also low enough to allow the rider's body weight to overcome in order to urge inner tube 210 toward a retracted position while piston valve 294 is open. Preferably, the inventor has determined that the extension force FE should be between about 15 and 35 lbs and preferably may be between about 20 and 25 lbs. As noted herein, the parameters of any given spring cartridge can be selected so that the resulting extension force $F_E$ is within this desired range.

Referring also to FIGS. 10 and 11, the dropper post 200 is shown with its piston valve 294 in its open configuration, as it would be when a rider has triggered the actuator 240. With the dropper post 200 In this configuration, if the rider wishes to move the inner tube 210 to its retracted position (FIG. 11) the axial force applied to the inner tube 210 must exceed the extension force $F_E$ (and any friction forces and losses, which are considered to be negligible as compared to the main extension force). Once extension force FE threshold has been exceeded the inner tube 210 will proceed to translate towards a retracted position while oil is transferred from upper chamber 282 to lower chamber 281. FIG. 11 shows dropper post 200 in a fully retracted position.

Figure 12:
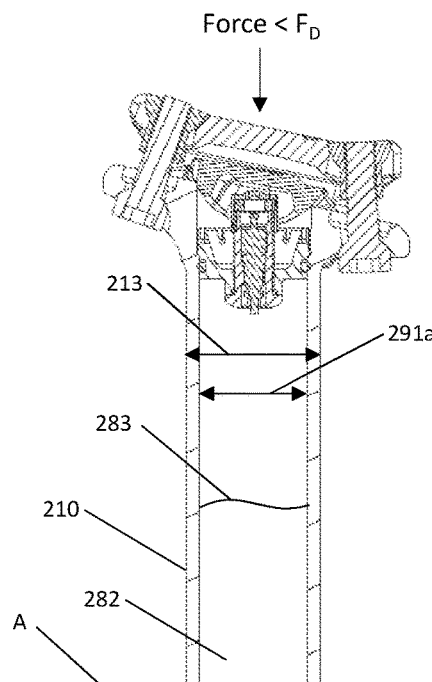
Figure 13:
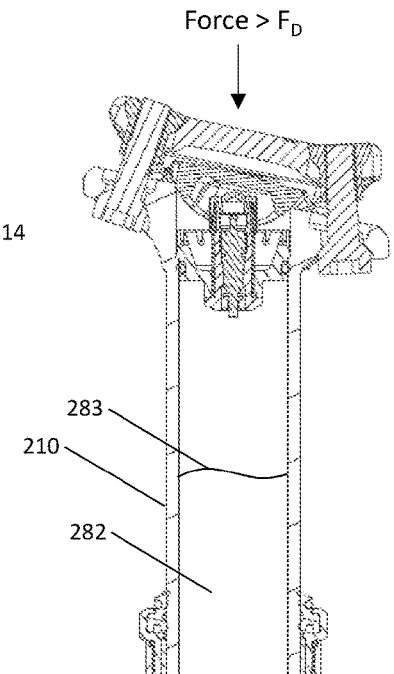

FIGS. 12 and 13 show actuation mechanism 270 in its relaxed (closed) position and with the piston valve 294 in its closed position. In this arrangement, the fluid path between the upper chamber 282 and the lower chamber 281 is interrupted and the spring cartridge 260 can be considered to be locked. When in this state, a force used to urge inner tube 210 towards a retracted position will place the oil in lower chamber 281 in tension, as moving the inner tube 210 downwardly relative to the piston valve 294 would lead to an to increase the volume of lower chamber 281, which would tend to lower the pressure acting on the liquid within the chamber 281. The generally incompressible nature of the liquid in the lower chamber 281 will tend to resist such movement while the piston valve 294 is closed. The combination of the liquid and gas in the upper chamber 282 may also tend to resist such relative movement of the piston valve 294 into the upper chamber 282 and compression of the interior of the upper chamber 282. However, because the gas in the upper chamber 282 is relatively compressible, the resistance to the movement of the piston valve 294 provided by the upper chamber 282 may be less than the resistance provided by the lower chamber 281.

In this arrangement (e.g. while the piston valve is closed and the spring cartridge is locked) the inner tube 210 will remain substantially, axially fixed relative to outer tube 220 (and piston valve 294) until a sufficient force is applied to overcome the tensile, resistive force that is generated by the oil under tension in lower chamber 281. That is, the spring cartridge will provide a resistive force that opposes axial movement of the inner tube when the spring cartridge is locked, and in particular a resistive force that will oppose the retraction of the inner tube 210 (e.g. will oppose movement of the inner tube 210 toward the retracted position). If a sufficiently large force is applied to the inner tube 210 that the magnitude of the applied force exceeds the resistive force of the cartridge, then relative motion between the piston 294 and the cylinder can occur, which will then result in an expansion of the volume of the chamber 281 which in turn lowers the vapour pressure within the chamber 281 and can pull dissolved gas(es) out of solution from the oil within chamber 281. This resistance force that opposes axial movement of the inner tube when the spring cartridge is locked can be referred to as a degassing force ($F_D$), and a force that exceeds the degassing force can be referred to as an overload force. The inventor has determined that the degassing force should preferably be between about 80 and 160 lbs and preferably between about 90 lbs and 140 lbs or between 90 and 120 lbs, and more preferably is less than 100 lbs, and is between 90 and 100 lbs. This range of forces has been found to offer a satisfactory rider experience and seat feel, while also allowing the seat post to yield when subjected to the overload forces as described herein. The inventor has also determined that this degassing force ($F_D$) can be a function of the geometry of the spring cartridge 260 and can be expressed as a force multiplier ($M_F$) of extension force ($F_E$) of a given cartridge, according to the relation below:

$$F_D = M_F \times F_E$$

To obtain a desired balance of extension and degassing forces in a commercial dropper post, the inventor has determined that the desired for force multiplier MF value may be between 3 and 6 and may preferably be between 4 and 5.

Using these novel parameters, if, in one example, a low-end of extension force $F_E$ range may be about 15 lbs, which if multiplied by an MF of 6 could would result in a force $F_D$ of about 90 lbs. If the cartridge is designed so that the extension force $F_E$ is toward the higher end of preferred range and is about 35 lbs, which if multiplied by an $M_F$ of 3 this would result in a degassing force FD of about 105 lbs.

When developing the present inventions, the inventor further determined that the force multiplier ($M_F$) is also proportional to the quotient of sliding surface diameter ($D_S$) 291a of the spring cartridge upper tube 261 and rod diameter ($D_R$) 263b. That is:

$$M_F \propto \left(\frac{D_S}{D_R}\right)$$

Preferably, when constructing dropper posts in accordance with the present teachings, the sliding surface diameter Ds may be between about 18 and 25 mm and preferably between about 20 and about 23 mm, as this may help provide a dropper post of a reasonable size that may fit many standard bicycles. The inventor has determined that acceptable rod diameters DR, e.g. that provide a suitable level of strength while still fitting into the other size limitations and area ratios that are used to provide the desired performance of the dropper posts described herein, may optionally be between about 6 and 10 mm and preferably between about 7 mm and about 9 mm.

As one of the factors that can be balanced in a given dropper post embodiment, the ratios of sliding surface diameter $D_S$ to rod diameter $D_R$ may therefore be between about 1.8 (18 divided by 10 or 18/10) and 4.17 (25 divided by 6 or 25/6), between about 2.22 (20 divided by 9 or 20/9) and about 3.29 (23 divided by 7 or 27/3) and preferably about 2.625 (21 divided by 8).

Figure 15:
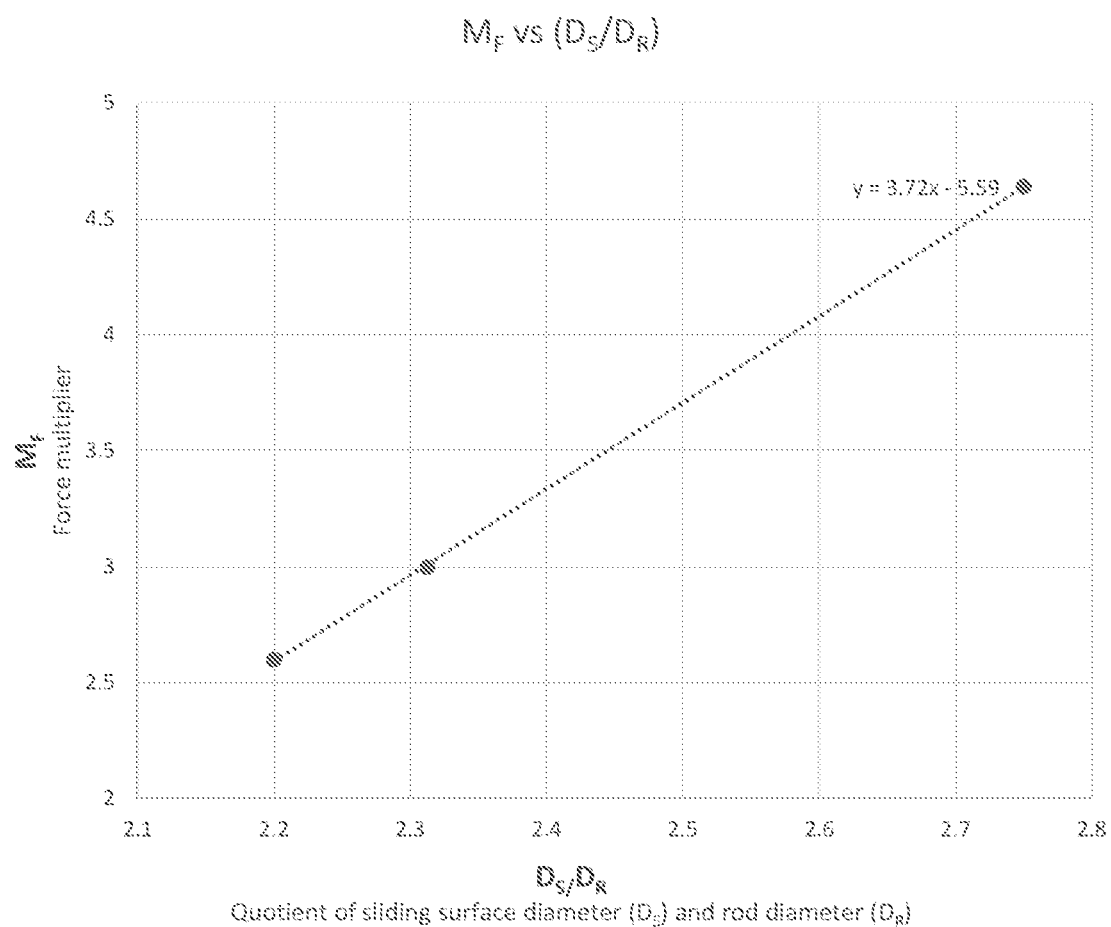
FIG. 15 is a graph showing $M_F$ vs ($D_S/D_R$).

Based on one known experimental data set that was obtained from a publication entitled Lockable Gas Springs "Gas Top" produced in 2021 by Vapsint(R) Gas Springs and Dampers, and available at http://www.vapsint.com/wp-content/uploads/2015/06/gas_top_vapsint.pdf, the force multiplier ($M_F$) versus the quotient of sliding surface diameter ($D_S$) 291a and rod diameter ($D_R$) 263b can be expressed via as graph of $M_F$ vs ($D_S/D_R$) as shown in FIG. 15.

One way of determining the force multiplier $M_F$ can be further defined based a line of best fit from the graph in FIG. 15 as:

$$M_F = 3.72\left(\frac{D_S}{D_R}\right) - 5.59$$

While fitting different lines of best fit may produce slightly different slope and y-intercept values, the inventor has determined that the preferred spring cartridge performance can be obtained using values that are not materially different than those provided herein. That is, the MF for a given example may be within about 10% of the value of the line of best fit equation.

One exemplary calculation for force multiplier $M_F$ using this experimental line of best fit and a ratio of sliding surface diameter $D_S$ to rod diameter $D_R$ of 2.625 (from above) is:

$$M_F = 3.72(2.625) - 5.59$$

$$M_F = 9.77 - 5.59$$

$$M_F = 4.1.8$$

While allowing for some variation in the constants in this example equation, the MF that is within about 10% of this calculated value may be between about 3.76 and about 4.6. Given these exemplary ratios above of sliding surface diameter $D_S$ to rod diameter $D_R$, force multiplier MF may be calculated as being between about 1.11 ($D_S/D_R$=1.8) and 9.91 ($D_S/D_R$=4.17), between about 2.67 ($D_S/D_R$=2.22) and about 6.65 ($D_S/D_R$=3.29) and preferably about 4.18 ($D_S/D_R$=2.625). Based on this, the preferred force multipliers MF may be between 3 and 6 and may preferably be between 4 and 5.

In these illustrated examples, if, while the piston valve 294 is closed and the spring cartridge is considered to be locked, inner tube 210 is urged towards its retracted position with a force that less than degassing Force $F_D$, inner tube 210 will remain axially fixed with outer tube 220. This can help facilitate the desired rider experience and the desired feeling of solidity and stability of the dropper post. However, when the force urging the inner tube 210 toward its retracted position exceeds the degassing force $F_D$ (and any associated losses, friction forces and the like), dissolved air is pulled out of solution within lower chamber 281. Small air bubbles 285 form in lower chamber 281 and this can allow a relatively small amount of relative axial movement of the inner tube 210 relative to the piston valve 294, shown as the overload cushion distance 284 (as shown in FIGS. 12 and 13). Preferably, the overload cushion distance 284 is less than the expected drop length 248 of the dropper post 200, and more preferably may be at least, and optionally can be between about 1 mm and 40 mm or between 10 mm and about 30 mm, and can between about 0% and about 20% of the travel length 248, and preferably can be between about 5% and about 15% of the travel length 248 to help provide a desired deflection or cushioning. This axial movement 284 therefore acts as a cushion if a rider overloads the post, such as while when riding or during a crash. Once the force urging inner tube 210 toward the retracted position drops back below the degassing force FD, the air bubbles 285 can go back into solution and the inner tube 210 returns to its original height (FIG. 12).

FIG. 12 further shows the location of a plane A, illustrated when the inner tube 210 of dropper post 200 is in its extended position. The plane A in this arrangement is at a location that is located along the length of the inner tube 210 and is adjacent the upper end of outer tube 220 and seat collar 230. The moment of inertia at plane A relates to the strength of inner tube 210 for a given material and load. This location, adjacent the seat collar 230 is a location where the inner tube 210 may be subjected to relatively high bending loads, as the portions of the inner tube 210 that are below the seat collar 230 are nested in and supported by the outer tube 220, while portions of the inner tube 210 that are exposed above the seat collar 230 are not supported in the same manner. Providing an inner tube 210 that is sufficiently strong at this location can help resist bending of the inner tube 210 when in use and extended.

In addition to conforming with the multiple geometric parameters described herein to provide the desired spring cartridge parameters, the moment of Inertia Ix for inner tube 210 at Plane A is defined by tube outer diameter $D_{TO}$ and tube inner diameter $D_{TI}$ as follows:

$$I_x = \frac{\pi(D_{TO}^4 - D_{TI}^4)}{64}$$

To help the dropper post 200 fit with standard bicycle tubes, the inner tube outer diameter $D_{TO}$ may be 25.5-30 mm and preferably is about 26-28 mm. The ratio of tube inner diameter $D_{TI}$ to tube outer diameter $D_{TO}$ may preferably be less than about 82.5% and preferable less than about 80%.

For example, the moment of inertia Ix for one preferred embodiment would have a diameter $D_{TO}$ of about 26 mm and a diameter $D_{TI}$ of about 20.8 mm (80% of diameter $D_{TO}$). The resulting moment of inertia calculation would be as follows:

$$I_z = \frac{\pi(26^4 - 20.8^4)}{64}$$

-continued $$I_x = \frac{\pi(269{,}798.6)}{64}$$

$$I_x = \pi(4215.6)$$

$$I_x = 13{,}243.7 \text{ mm}^4$$

Similarly, the inventor has discovered that the moment of inertia Ix for the preferred ranges of tube outer diameters $D_{TO}$ and tube inner diameters $D_{TI}$ described herein may be between about 11,140 mm$^4$ (DTO=25.5, DTI=21.0 (82.5% of diameter DTO)) and about 23,474 mm$^4$ (DTO=30, DTI=24.0 (80% of diameter DTO)).

Figure 14:
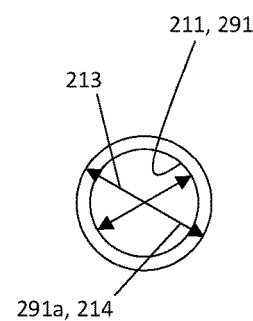
FIG. 14 is a cross-sectional view of a portion of the dropper post of FIG. 12, taken along Plane A.

FIG. 14 shows the cross section of inner tube 210 taken at Plane A of the illustrated embodiment and includes an inner tube outer diameter (DTO) 213 and inner tube inner diameter (DTI) 214 as two co-axial diameters. While in these examples the tubes 210 and 220 are shown as being circular in cross-sectional shape, other shapes and be used including ovular, non-coaxial circles or various sided polygons and the moment of inertia calculation would change to another known formula, but analogous ratios could be utilized.

Using the preferred geometries of the tubes 110 and 210 that can help provide the desired areas and forces described herein, the inventor has discovered that the moment of inertia at plane A for such designs may be greater than about 11,000 mm$^4$, and in some more preferred examples can be greater than about 13,000 mm$^4$. Similarly, the tube outer diameter $D_{TO}$ may be 25.5-30 mm and preferably 26-28 mm, and therefore the ratio of tube inner $D_{TI}$ diameter to tube outer diameter $D_{TO}$ may be less than about 82.5% and preferable less than about 80%, and the ratio of Ix of inner tube 210 (in mm$^4$) at plane A to the force multiplier $M_F$ ($I_x/M_F$) may define a ratio described herein as the cushion quotient $Q_C$, and the inventor has determined that preferred examples of the dropper posts described herein can have a cushion quotient that is equal to or greater than about 2400 mm$^4$, 2500 mm$^4$, 2600 mm$^4$, 2700 mm$^4$ or more. The table below shows moment of inertia, force multiplier and cushion quotient values for two examples dropper posts considered by the inventor.

| Post | $D_{TI}$ (mm) | $D_{TO}$ (mm) | $D_S$ (mm) | $D_R$ (mm) | Ds/Dr | $M_F$ | Operating pressure (psi) | $F_E$ (lbs) | $F_D$ (lbs) | Ix at Plane A (mm$^4$) | Cushion Quotient $I_x/M_F$ (mm$^4$) |
|---|---|---|---|---|---|---|---|---|---|---|---|
| 1 | 26 | 20.8 | 20.8 | 8 | 2.6 | 4.082 | 300 | 23.37 | 95.41 | 13243.70 | 3244.41 |
| 2 | 28 | 24 | 24 | 8 | 3 | 5.57 | 300 | 23.37 | 130.19 | 13885.83 | 2492.96 |

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent, or patent application was specifically and individually indicated to be incorporated by reference in its entirety.

I claim:

1. A dropper post assembly for supporting a bicycle seat, the dropper post assembly comprising:
   a) an outer tube extending along a post axis between a lower end and an upper end;
   b) an inner tube having an outer diameter that is between 25.5 mm and 30 mm, an upper end that is connectable to a bicycle seat, and a lower end that is axially spaced from the upper end and is disposed within the outer tube, the inner tube being configured to be axially slidable within the outer tube by a travel distance that is at least 200 mm between a retracted position in which the lower end of the inner tube is proximate the lower end of the outer tube and an extended position in which the lower end of the inner tube is axially spaced from the lower end of the outer tube
   c) a spring cartridge comprising
      i. an axially extending cylinder disposed within the inner tube
      ii. a piston movably received within the cylinder, the cylinder comprises an inward facing sliding surface and the piston slidably seals against the sliding surface thereby dividing the cylinder to provide a first chamber containing a liquid and disposed on a lower side of the piston, and a second chamber and disposed on an opposing, upper side of the piston and a combination of the liquid and a gas, whereby moving the inner tube toward the retracted position expands the first chamber,
      iii. a valve disposed in the piston and configurable in an open position in which fluid communication is established between the first chamber and second chamber and the spring cartridge is in an unlocked configuration in which the spring cartridge exerts an extension force (FE) on the inner tube that biases the inner tube toward the extended position, and a closed position in which the first chamber is fluidly isolated from the second chamber and the cartridge is in a locked configuration in which the spring cartridge is operable to generate a degassing force (FD) of between about 90 lbs and about 140 lbs to resist movement of the inner tube toward the retracted configuration, wherein when the valve is in the closed position and an overload force that exceeds the degassing force is applied axially to the spring cartridge the inner tube translates downwardly relative to the piston via an overload cushion distance that is between about 0% and about 20% of the travel distance thereby forming bubbles in the liquid in the first chamber; and
   d) an actuator having a body disposed at the lower end of the outer tube and operable to change the spring cartridge between the locked configuration and the unlocked configuration.

2. The dropper post assembly of claim 1, wherein the spring cartridge is configured such that when the valve is in the closed position and the overload force is removed the inner tube translates upwardly relative to the piston by the overload cushion distance and the bubbles go back into solution in the liquid in the first chamber.

3. The dropper post assembly of claim 1, wherein the overload cushion distance is between about 1 mm and 40 mm.

4. The dropper post assembly of claim 3, wherein the overload cushion distance is between 10 mm and about 30 mm.

5. The dropper post assembly of claim 1, wherein the gas in the second chamber is at an operating pressure that is between about 200 psi and about 300 psi.

6. The dropper post assembly of claim 1, wherein the upper end of the outer tube comprises a seat collar and when the inner tube is in the extended position a moment of inertia (Ix) taken in a plane that is orthogonal to the post axis, and adjacent the seat collar is at least 11,000 mm$^4$.

7. The dropper post assembly of claim 6, wherein the moment of inertia is greater than 13,000 mm$^4$.

8. The dropper post assembly of claim 6, wherein the degassing force divided by the extension force defines a force multiplier $M_F(M_F=F_D/F_E)$, and dividing the moment of inertia by the force multiplier defines a cushion quotient $Q_C(Q_C=Ix/M_F)$, and wherein the cushion quotient is at least 2400 mm$^4$.

9. The dropper post assembly of claim 8, wherein the force multiplier is between about 3 and 6.

10. The dropper post assembly of claim 9, wherein the force multiplier is between 4 and 5.

11. The dropper post assembly of claim 8, wherein the cushion quotient is at least 2600 mm$^4$.

12. The dropper post assembly of claim 1, wherein the spring cartridge comprises a cartridge rod having a rod diameter that is between about 7 mm and about 9 mm and extending from the piston through the first chamber and further comprising an actuation rod extending from the body of the actuator and through the cartridge rod to the valve and operable to selectably open and close the valve.

13. The dropper post assembly of claim 12, wherein the sliding surface defines a sliding surface diameter ($D_S$) that is between about 18 mm and about 25 mm and the cartridge rod has a cartridge rod diameter ($D_R$), and wherein a ratio of the sliding surface diameter to the cartridge rod diameter ($D_S$: $D_R$) that is between about 1.8 and about 4.17.

14. The dropper post assembly of claim 13, wherein the degassing force divided by the extension force defines a force multiplier $M_F(M_F=F_D/F_E)$ and wherein the force multiplier is within about 10% of $$3.72\left(\frac{D_s}{D_R}\right) - 5.59.$$

15. The dropper post assembly of claim 1, wherein the valve comprises a valve body formed in the piston and a plunger that seals against the valve body when the valve is in the closed position and that is translatable relative to the valve body and into the second chamber to change the valve to the open position, whereby a plunging force required to translate the plunger relative to the valve body is substantially constant regardless of the axial position or loading of the inner tube.

16. The dropper post assembly of claim 15, wherein the plunging force required when the inner tube is subjected to an axial load is within about 10% of the plunging force required to translate the plunger relative to the valve body when the inner tube is unloaded.

17. The dropper post assembly of claim 1, wherein the cylinder is integrally formed with the inner tube, whereby the inner tube comprises the sliding surface.

18. The dropper post assembly of claim 1, further comprising an outer cartridge tube that comprises the cylinder and that is disposed within and is connected to translate with the upper tube.

19. The dropper post assembly of claim 1, wherein the degassing force is equal to or less than 100 lbs, and the extension force is between about 15 lbs and about 35 lbs.

20. The dropper post assembly of claim 1, wherein the inner tube comprises an inner diameter that is less than 82.5% of the outer diameter.

\* \* \* \* \*